(12) United States Patent
Lo et al.

(10) Patent No.: US 9,170,932 B1
(45) Date of Patent: Oct. 27, 2015

(54) SYSTEM DATA STORAGE MECHANISM PROVIDING COHERENCY AND SEGMENTED DATA LOADING

(75) Inventors: Jerry Lo, Hacienda Heights, CA (US); Dominic S. Suryabudi, Irvine, CA (US); Lan D. Phan, Garden Grove, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 544 days.

(21) Appl. No.: 13/478,036

(22) Filed: May 22, 2012

(51) Int. Cl.
- *G06F 12/00* (2006.01)
- *G06F 12/02* (2006.01)
- *G06F 3/06* (2006.01)
- *G06F 11/14* (2006.01)

(52) U.S. Cl.
CPC .......... *G06F 12/0246* (2013.01); *G06F 3/0679* (2013.01); *G06F 11/1448* (2013.01); *G06F 11/1458* (2013.01); *G06F 11/1469* (2013.01)

(58) Field of Classification Search
CPC ............ G06F 12/0246; G06F 12/1009; G06F 11/1471
See application file for complete search history.

(56) References Cited

U.S. PATENT DOCUMENTS

| | | | |
|---|---|---|---|
| 5,835,955 A | 11/1998 | Dornier et al. | |
| 6,728,826 B2 | 4/2004 | Kaki et al. | |
| 6,856,556 B1 | 2/2005 | Hajeck | |
| 7,126,857 B2 | 10/2006 | Hajeck | |
| 7,212,440 B2 | 5/2007 | Gorobets | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,502,259 B2 | 3/2009 | Gorobets | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,913,061 B2 | 3/2011 | Gorobets et al. | |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |

(Continued)

OTHER PUBLICATIONS

U.S. Appl. No. 13/468,999, filed May 10, 2012, to Lo, et al., 32 pages.

(Continued)

*Primary Examiner* — Cheng-Yuan Tseng
*Assistant Examiner* — Tahilba Puche
(74) *Attorney, Agent, or Firm* — Wilmer Cutler Pickering Hale and Dorr LLP

(57) ABSTRACT

A data storage subsystem is disclosed that implements a process for storing and/or reconstructing system data, such as a system mapping table. In certain embodiments, table pages are systematically copied, or flushed, to non-volatile memory in a progressive manner, according to a fixed ratio of flushed table pages per table update trigger, thereby facilitating write and/or load efficiency. Full or partial reconstruction of a table may be performed within a bounded number of operations based on the size of the table, the ratio implemented, and/or other characteristics.

16 Claims, 6 Drawing Sheets

(56) References Cited

U.S. PATENT DOCUMENTS

| | | |
|---|---|---|
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,194,340 B1 | 6/2012 | Boyle et al. |
| 8,194,341 B1 | 6/2012 | Boyle |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2002/0184436 A1 | 12/2002 | Kim et al. |
| 2003/0065899 A1 | 4/2003 | Gorobets |
| 2004/0210706 A1 | 10/2004 | In et al. |
| 2005/0166028 A1 | 7/2005 | Chung et al. |
| 2008/0098195 A1 | 4/2008 | Cheon et al. |
| 2009/0150599 A1* | 6/2009 | Bennett ................ 711/103 |
| 2010/0106897 A1 | 4/2010 | Yoshimura |
| 2010/0174849 A1 | 7/2010 | Walston et al. |
| 2010/0180068 A1 | 7/2010 | Matsumoto et al. |
| 2010/0250793 A1 | 9/2010 | Syu |
| 2010/0262799 A1* | 10/2010 | Lasser et al. ............ 711/162 |
| 2011/0099323 A1 | 4/2011 | Syu |
| 2011/0161621 A1 | 6/2011 | Sinclair et al. |
| 2011/0283049 A1 | 11/2011 | Kang et al. |
| 2011/0307651 A1 | 12/2011 | Wong |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0166819 A1 | 6/2013 | Yerushalmi et al. |
| 2013/0185508 A1 | 7/2013 | Talagala et al. |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

U.S. Appl. No. 13/468,946, filed May 10, 2012, to Lo, et al., 29 pages.
U.S. Appl. No. 13/470,206, filed May 11, 2012, to Lo, et al., 30 pages.

* cited by examiner

SYSTEM DATA STORAGE MECHANISM PROVIDING COHERENCY AND SEGMENTED DATA LOADING

BACKGROUND

1. Technical Field

This disclosure relates to non-volatile storage subsystems. More particularly, the disclosure relates to systems and methods for storing and loading system table data.

2. Description of the Related Art

Non-volatile storage systems can include system tables, such as tables containing logical-to-physical address mapping data. Such data may associate logical addresses used by a host system with corresponding physical storage locations in the non-volatile storage system. In certain circumstances, it may be desirable for system table data to be loaded from non-volatile memory into volatile memory, along with log data that indicates changes to a system table. However, loading and updating system table data can incur delays for memory accesses.

BRIEF DESCRIPTION OF THE DRAWINGS

Systems and methods that embody the various features of the invention will now be described with reference to the following drawings, in which.

DETAILED DESCRIPTION

Figure 1:
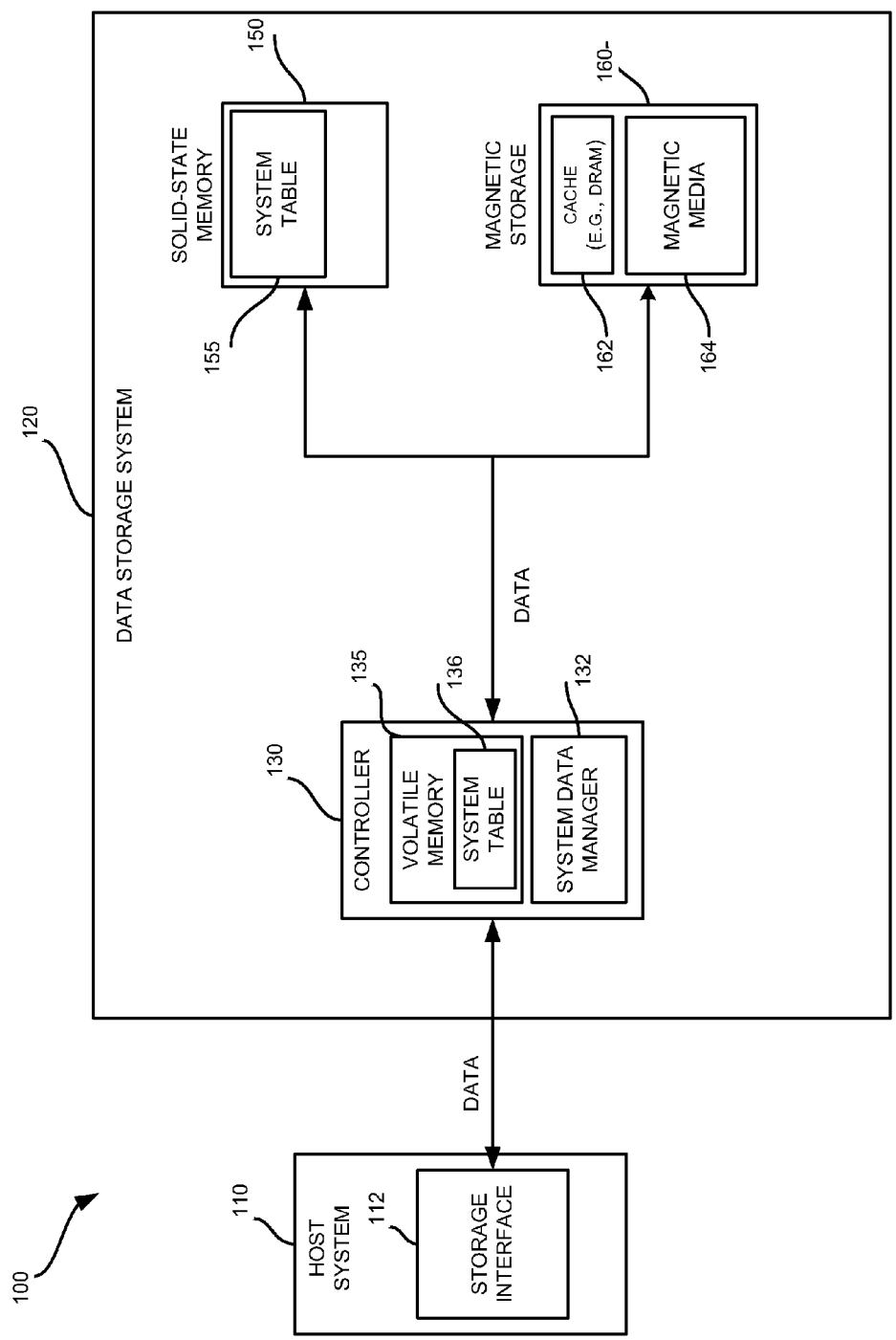
FIG. 1 illustrates a storage system 100 that implements system data storage in accordance with one or more embodiments of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Data storage systems may include system tables having various sizes and/or characteristics. With respect to system tables of certain sizes, it may be desirable to periodically store table data and/or table change logs, in non-volatile memory in order to avoid unwanted data loss. However, storage of table data may make present various data storage and/or loading efficiency or reliability concerns. Furthermore, loading partial segments of system table data may be difficult in systems with inadequate, or complicated, data coherency characteristics. As used in this application, a "segment" refers broadly to any partition, division, or portion of a whole. Segments may or may not be of equal size and the size of a segment may vary over time.

Certain data storage systems implement progressive copying, or "flushing" of system table data from volatile memory to non-volatile storage. Data coherency may be relatively easier to attain in such systems, though write and/or load time considerations may need to be taken into account. In addition, the ability to load partial segments of table data efficiently may be a concern.

In some embodiments of the present invention, system data is stored in a progressive manner, without the use of log data. In certain embodiments, such a system may allow for satisfactory loading of partial segments of table data, while maintaining satisfactory levels of data coherency.

System Overview

In non-volatile storage devices, such as solid-state storage devices, commands can be received from a host designating a logical memory address. The logical memory address can then be converted into a physical address corresponding to a storage location on the non-volatile media. This logical-to-physical address mapping may be maintained in a mapping table in volatile memory of a controller of the storage device. As changes are made to the mapping table in volatile memory, the controller may periodically save a copy of the mapping table, or pages of the mapping table, to the non-volatile storage array to ensure that the mapping table can be reconstructed in the volatile memory when power is lost. Because the mapping table can comprise a significant amount of data (e.g. 256 Mb for a 256 Gb drive), changes to the mapping table made between saves to the non-volatile storage array can be recorded in a log of mapping table changes and the log can also be saved to non-volatile memory. Alternatively, in certain embodiments disclosed herein, table pages are updated and flushed progressively, such that log pages are unnecessary. Progressive flushing of table pages may allow for recording of changes without the need for log pages. On system power up, table data in the non-volatile memory may be loaded to the volatile memory prior to servicing any media access requests to ensure the logical addresses resolve to the proper locations on the storage array.

FIG. 1 illustrates a storage system 100 that implements system data storage in accordance with one or more embodiments of the invention. As shown, a data storage system 120 (e.g., a disk drive, such as a hybrid disk drive, or solid-state drive) includes a controller 130, solid-state storage module 150, such as a solid-state memory device, which comprises system table data 155. In certain embodiments, data storage system 120 may be a hybrid design including a magnetic storage module 160, which comprises magnetic media 164 (e.g., a magnetic disk). The non-volatile memory module 150 can comprise one or more non-volatile solid-state memory arrays.

The term "non-volatile memory" is used herein according to its broad and ordinary meaning, and may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

The controller 130 can be configured to receive data and/or storage access commands from a storage interface module 112 (e.g., a device driver) in a host system 110. Storage access commands communicated by the storage interface 112 can include read and/or write commands issued by the host system 110. Read and write commands can specify a logical block address in the storage system 120. The controller 130 can execute the received commands in the non-volatile memory module 150, for example. In certain embodiments, the controller can include memory (e.g., DRAM) for storing data, such as system table data. In certain embodiments, one or more of the depicted devices or modules may be omitted, such as, for example, magnetic storage 160.

The solid-state memory module 150 may be implemented using NAND flash memory devices. Other types of solid-state memory devices can alternatively be used. In one embodiment, the memory devices are MLC devices, SLC memory devices, or a combination of SLC and MLC devices.

The data storage system 120 can store data communicated by the host system 110. That is, the storage system 120 can act as memory storage for the host system 110. To facilitate this function, the controller 130 can implement a logical interface that can present to the host system 110 storage system's 120 memory as a set of logical addresses (e.g., contiguous address) where data can be stored. Internally, the controller 130 can map logical addresses to various physical memory addresses in the non-volatile memory module 150 and/or the magnetic media 164.

In one embodiment, at least a portion of the solid state memory module 150 can be used as cache. The controller 130 can store data communicated by the host system 110 in the solid-state memory 150. To improve performance of the storage system 120 and/or host system 110, in some embodiments, various types of data can be stored in non-volatile memory cache, including frequently accessed data, data accessed at start-up (e.g., following a reset or power down), system data, sequentially accessed data, etc.

With continued reference to FIG. 1, the storage system 120 is in communication with the host 110 through storage interface 112. The interface 112 provides a communications pathway between the host device 110 and the storage system 120, and can implement any method of communication as known in the art, such as SATA, SAS, USB, Firewire and other communication methods. The controller 130 may be responsible for receiving and processing commands from the host 110 as well as internal commands. Functions of the controller 130 can be implemented in hardware and/or software on a processor and can be located in one or more physical components according to design preference. The controller 130 includes a volatile memory unit 135, such as, for example, DRAM, that stores one or more system tables 136. In certain embodiments, system table data 136 can be separated into a plurality of segments. Each segment corresponds to a portion of the logical or physical addresses used in the system table. The controller 130 may also include an invalid page table and associated logs, or other system data.

The controller 130 depicted in FIG. 1 includes a system data manager module 132, which may manage the storing and/or loading of system data. Data maintained in volatile memory may be lost during a power failure event. Therefore, it may be desirable for the controller 130 to copy (or "flush") certain information to non-volatile storage, such as solid-state memory 150. In certain embodiments, system data may be stored as segments on the solid-state memory device 150. The segments stored on the solid-state memory device 150 may be stored together or in different portions of the device. In a shingle implementation where magnetic media 164 are written with overlapping data tracks and address indirection is used, the system data may be stored in magnetic media 164.

Table Storage Structure

Figure 2:
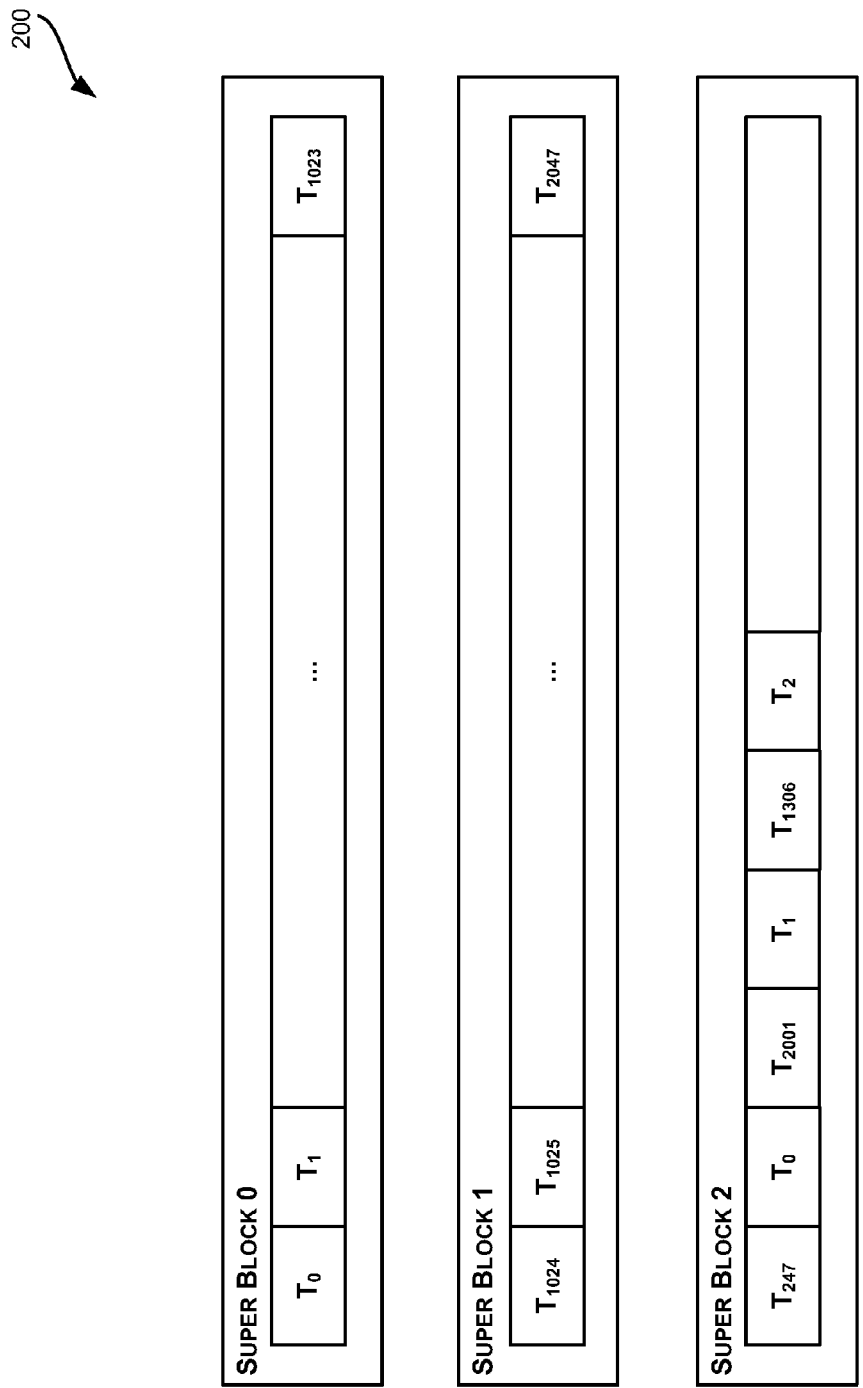
FIG. 2 illustrates a portion of a non-volatile memory array.

FIG. 2 illustrates a portion 200 of a non-volatile memory array including a plurality of portions, such as superblocks, of a non-volatile memory array. Specifically, the portion 200, as shown, includes three superblocks, superblock 0, superblock 1, and superblock 2. Each superblock may contain one or more pages of system data. A copy of the table resides in volatile memory and is periodically updated, and such updates need to be saved back to the non-volatile memory to ensure data coherency. Pages of system data from the volatile memory may be thus progressively flushed to non-volatile memory in response to system data update triggers. For example, an update trigger may include a host-initiated) operation affecting one or more pages or segments of table data.

In the example shown, superblocks 0 and 1 contain pages of the system table. In certain embodiments, table data storage in accordance with one or more embodiments of the present disclosure may be desirable for storage of large system tables. For example, superblocks 0 and 1 may contain a large system table, wherein the pages of the table are disposed in sequential order within the superblocks. As shown, superblock 0 includes table pages $T_0$ through $T_{1023}$, while superblock 1 includes table pages $T_{1024}$ through $T_{2047}$. Assuming this is the state at power-up, a copy of the table is loaded into volatile memory.

Superblock 2 contains one or more table pages stored in response to one or more system update triggers. In certain embodiments, superblock 2 may contain table pages according to a pre-defined ratio of table pages flushed for each table update trigger event. For example, in a storage system utilizing a ratio of 2 to 1, whenever a table page is updated in the volatile memory in response to a host request, an additional page of table data is flushed to the non-volatile storage. In such an embodiment, two pages are written per update trigger. The ratio of two pages written per update trigger may require that two times the number of bare minimum superblocks number of operations, plus 1, is required to perform active writes. As shown in FIG. 2, superblock 2 contains table pages stored according to a ratio of two table pages flushed per update trigger. Therefore, if, for example, table page $T_{247}$ in the volatile memory is updated in response to a host system request, another page, such as table page $T_0$, is flushed to non-volatile memory along with table page $T_{247}$.

Figure 3:
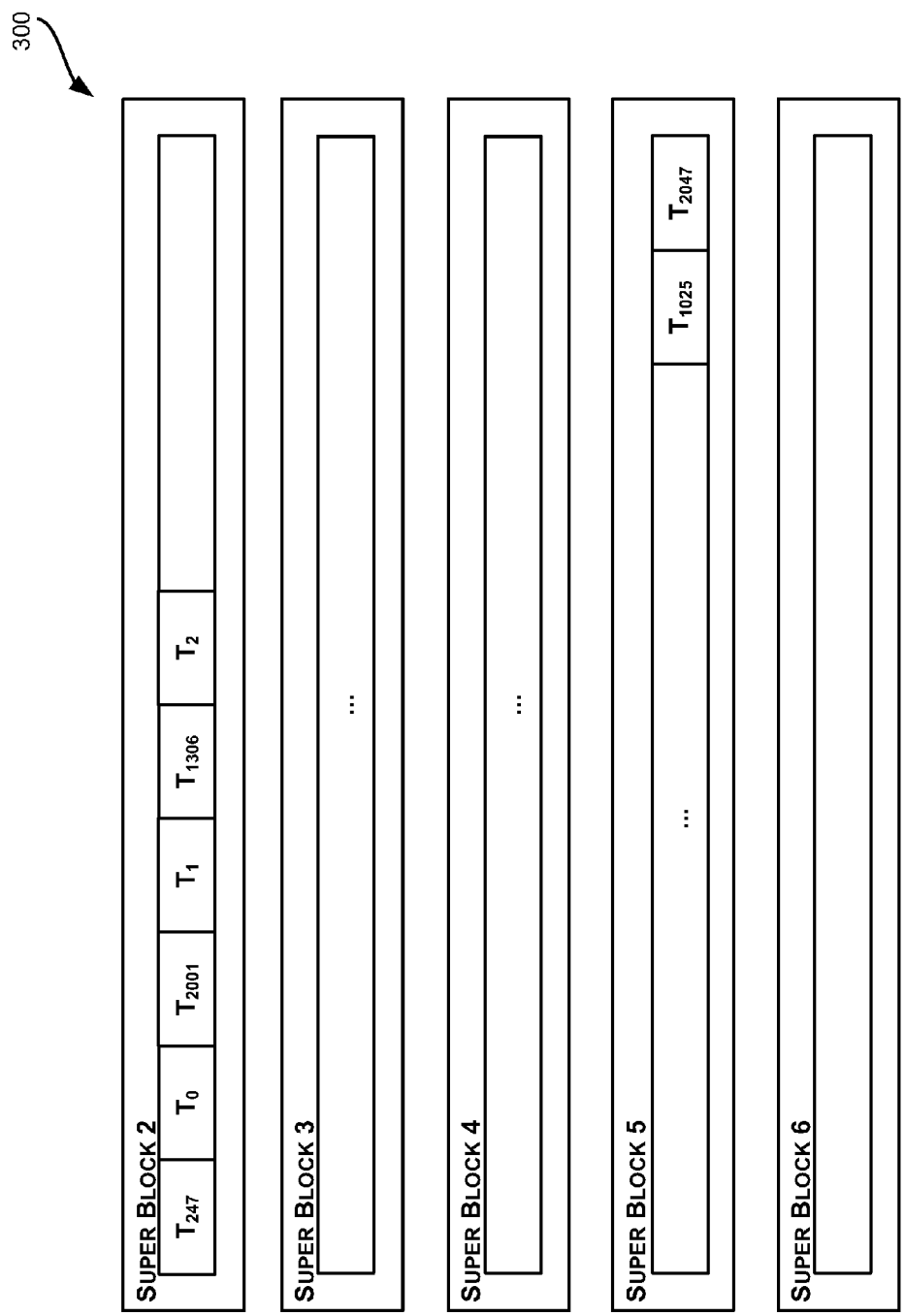
FIG. 3 illustrates a portion of a non-volatile memory array.

FIG. 3 illustrates a portion 300 of a non-volatile memory array including a plurality of portions, such as superblocks of a non-volatile memory array. The portion 300 shown provides an example of how system data may be arranged after a period of time during which table data in the volatile memory have been progressively updated and changes are saved to the non-volatile memory. As shown in the figure, superblocks 0 and 1 have been retired (and slated for garbage collection), and are not shown. That is, the data saved in superblocks 0 and 1 has become outdated, as the entire system table is contained within the blocks shown. In other words, the data necessary to reconstruct the copy of the system table in the volatile memory is contained within the superblocks 2-5. Embodiments disclosed herein, may provide the benefit of reconstruction within a bounded number of operations, based on forced flushing of table pages progressively as update triggers occur.

Progressive flushing of table data, as described herein, may allow for large system data to be stored without single block restrictions. Furthermore, such methods may provide bounded segmented system data loading.

Table Reconstruction

Figure 4:
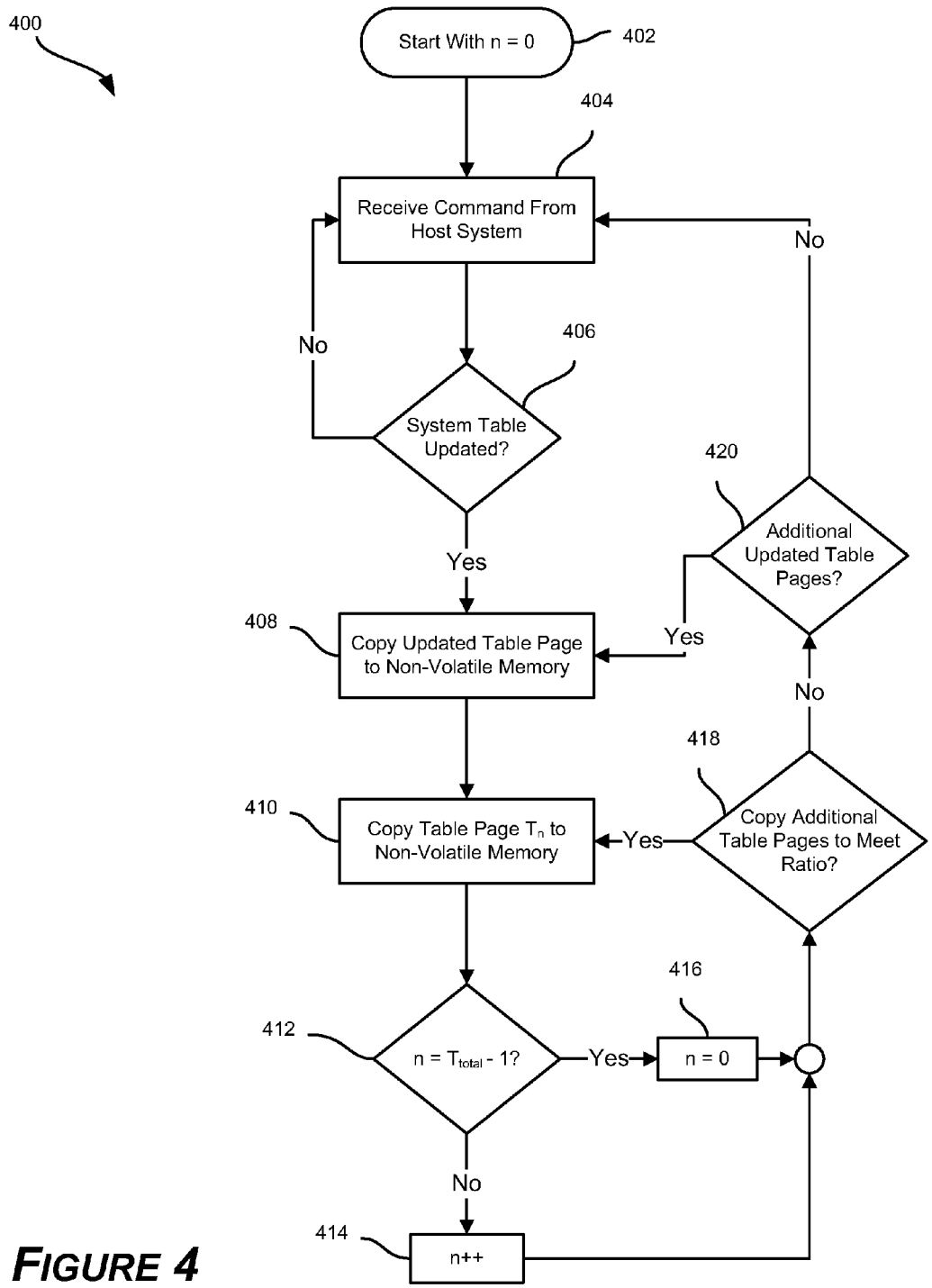
FIG. 4 illustrates a process for storing system table data in a non-volatile memory array.

FIG. 4 illustrates a process 400 for storing system table data from a volatile memory array to a nonvolatile memory array. In one embodiment, the process 400 is performed by the controller 130. The process 400 starts at block 402. For convenience, a variable n is used as a reference variable for implementing one or more steps of the process 400. At block 404, a command is received from a host system. At decision block 406, it is determined whether the command from the host system corresponds to a system table update. If the command does not involve a system table update, the process 400 is directed back to block 404.

When the command involves a system table update, the process 400 includes copying the updated table page to nonvolatile memory at block 408. In addition, one or more additional pages of table data are copied to nonvolatile memory in response to the host command. A first additional table page $T_n$ is copied to the non-volatile memory at block 410. At decision block 412, it is determined whether variable n is equal to $T_{total}-1$, wherein $T_{total}$ is a variable representing the total number of pages of the system table. If not, the variable n is incremented at block 414, and the process 400 is directed to decision block 418, where it is determined whether additional table pages are to be copied to meet a predefined ratio of copied pages to system table update triggers. The process 400 may be implemented according to any suitable ratio of copied pages to system table update triggers. For example, the ratio of copied pages to system table update triggers may be 2 to 1, 3 to 1, 4 to 1, or any other ratio.

When it is determined at block 412 that variable n is equal to $T_{total}-1$, the process 400 proceeds to block 416, where variable n is reset to zero. When additional table pages are to be copied in order to meet the predefined ratio, the process 400 loops back to block 410, and continues in a loop until the ratio of copied table pages to system table update triggers has been met. Once the ratio has been met, the process 400 proceeds to decision block 420, where it is determined whether the host system command requires additional table pages to be updated. If so, the process 400 is directed back to block 408, and the process 400 proceeds from that point. When additional table pages are to be updated in response to the command received from the host system, the process 400 proceeds back to block 404 where another command is received from the host system. From that point, the process 400 may proceed as described above.

Figure 5A:
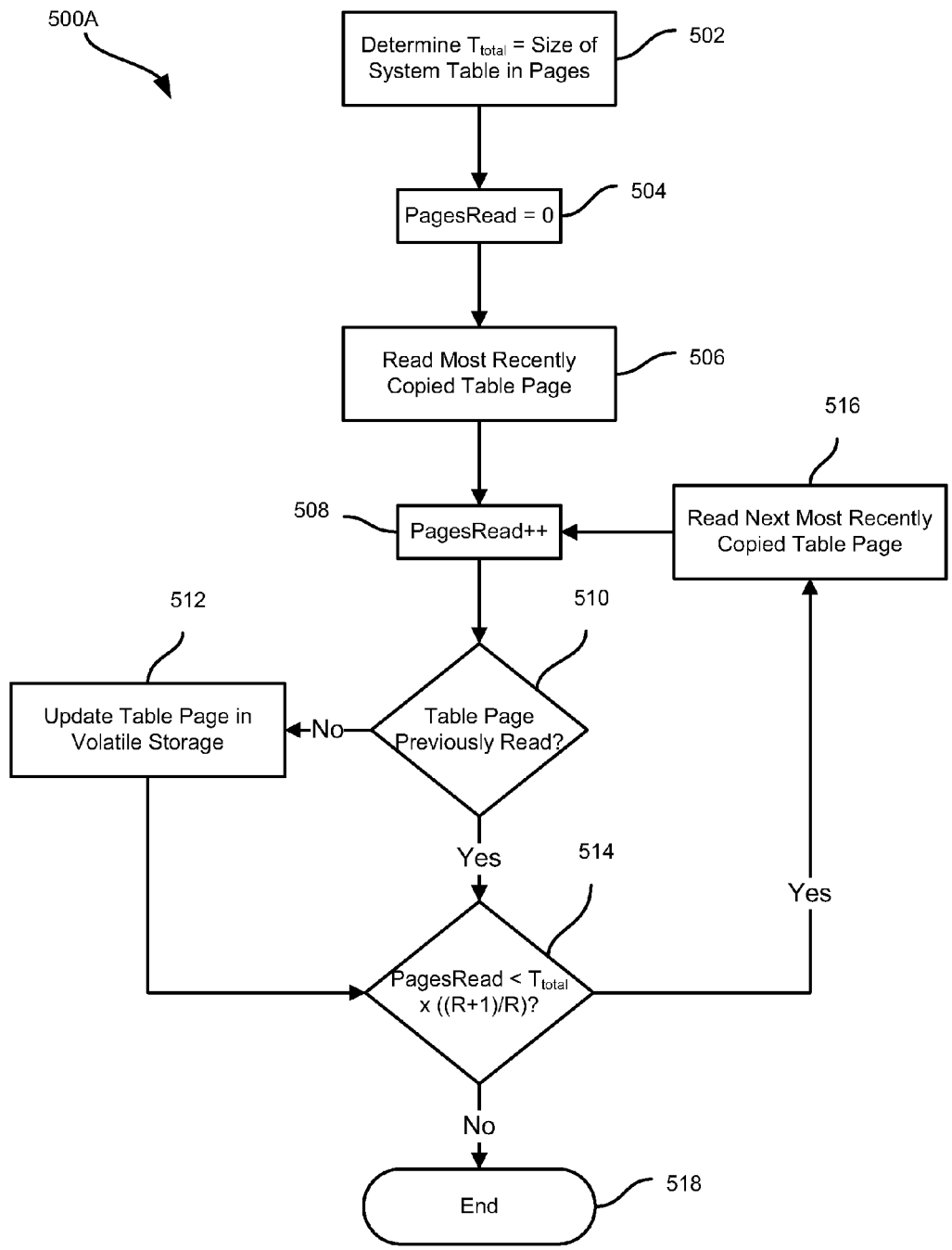
FIG. 5A illustrates a process for reconstructing a system table stored in non-volatile memory to a volatile memory array.

FIG. 5A illustrates a process 500A for reconstructing a system table stored in non-volatile memory to a volatile memory array. In one embodiment, the process 500A is performed by the controller 130 whenever table reconstruction is needed (e.g., at power-up). The process 500A includes determining a value for a variable $T_{total}$, which is equal to the size of the system table to be reconstructed, in pages. This is performed at block 502. The process 500A further includes setting a value for a variable referred to for convenience as "PagesRead" to 0, wherein the variable PagesRead represents the number of table pages read from non-volatile storage during reconstruction at a given point. The process 500A includes reading the table page that was most recently copied from volatile memory to non-volatile memory at block 506. Once the most recently copied table page has been read, the variable PagesRead is incremented by one, indicating that one page has been read at that point. Block 508 is where incrementing the variable PagesRead is performed.

The process 500A proceeds to decision block 510 where it is determined whether the most recently read table page has been previously read in the reconstruction process 500A. If not, at block 512, the system table in volatile storage is updated with respect to the most recently read table page. The process 500A proceeds to decision block 514 where it is determined whether the variable PagesRead is less than the product of $T_{total}$ times $((R+1)/R)$, wherein R represents a predefined ratio of table pages flushed or copied to nonvolatile memory per system table update trigger, as described above. If not, the process 500A is terminated at block 518, and the system table has been fully reconstructed.

If the variable PagesRead is determined to be less than $T_{total} \times ((R+1)/R)$, then the process 500A proceeds to block 516 where the next most recently copied table page is read. The process 500A proceeds in the loop until the number of pages read is equal to the bounded value of $T_{total} \times ((R+1)/R)$. In certain embodiments, the process 500A provides the benefit of bounded system data loading.

Figure 5B:
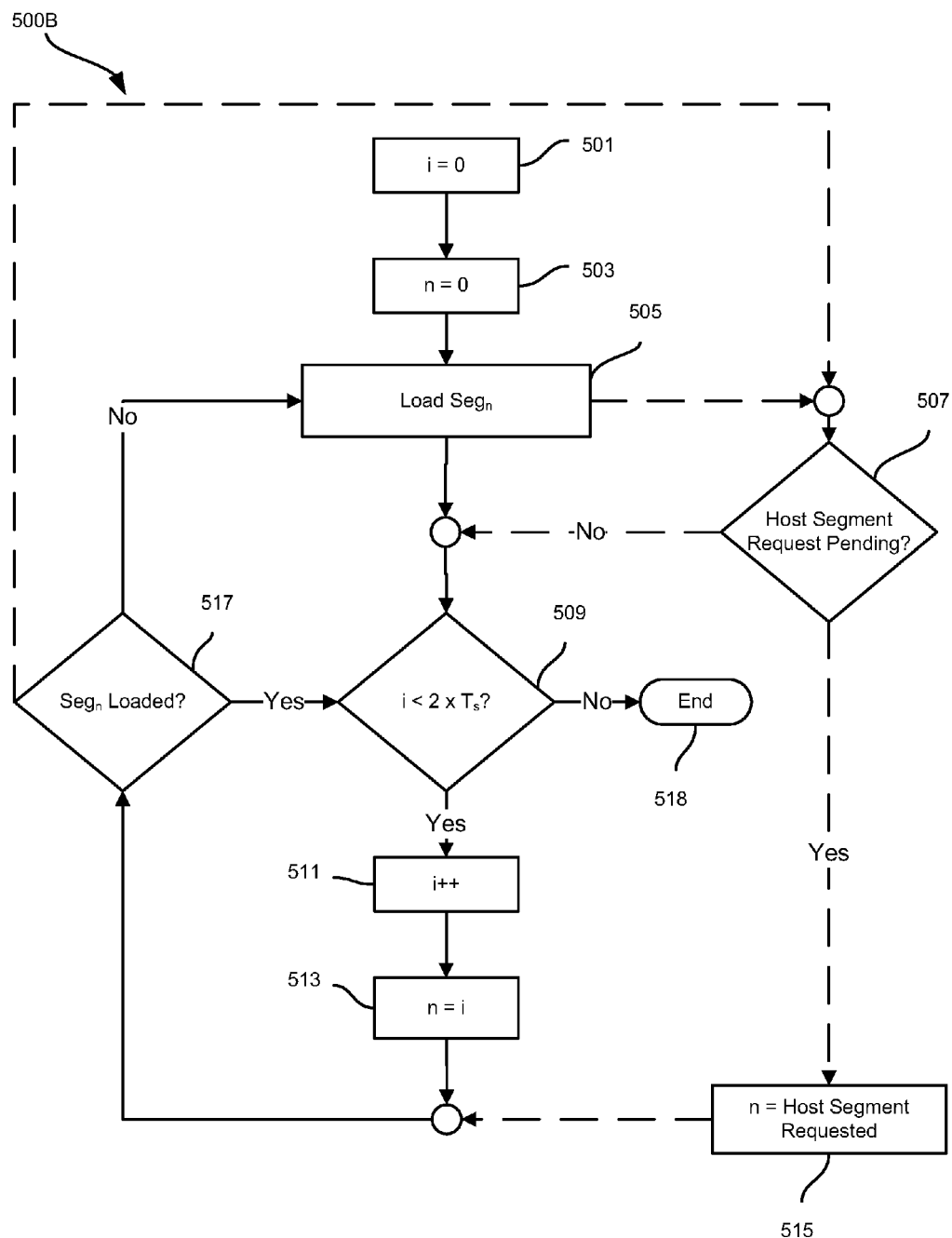
FIG. 5B illustrates a process for reconstructing segmented system table data stored in nonvolatile memory to volatile memory array.

FIG. 5B illustrates a process 500B for reconstructing segmented system table data stored in nonvolatile memory to a volatile memory array. In one embodiment, the process 500B is performed by the controller 130. The process 500B includes setting two variables, i and n, equal to zero, at blocks 501 and 503, respectively. In certain embodiments, n may be set to a value representing the location of the most recently stored mapping pages to non-volatile memory, or to a value representing the location of an oldest valid table page stored in non-volatile storage. In such embodiments, the variable i may be incremented at block 513 in such a way that the process 500B iteratively steps through the pages stored in volatile memory in reverse chronological order, reverse chronological order, or some other order to allow for reconstruction of the mapping table. At block 505, a segment $Seg_n$ is loaded from nonvolatile memory to volatile memory. For example, the process 500B may include initially loading a first segment, $Seg_0$, to volatile memory.

In certain embodiments, the process 500B proceeds to decision block 507, though in other embodiments, the process 500B may bypass decision block 507, as well as block 515, and proceed to decision block 509. At decision block 507, it is determined whether a host data access request accessing an address within a yet-to-be-loaded segment is pending. If such a host segment request is pending, the variable n is set to the requested host segment, the process 500B thereafter proceeding to process the requested host segment. At decision block 517 it is determined whether segment $Seg_n$ has been previously loaded to volatile memory. If it has not, the process 500B progresses to block 505, where $Seg_n$ is loaded. If it is determined at block 517 that $Seg_n$ has been previously loaded, the process 500B proceeds to decision block 507 where, as described above, it is determined whether a host segment request is pending.

If at decision block 507 it is determined that no host segment request is currently pending, or if decision block 507 is bypassed, the process 500B proceeds to decision block 509, wherein it is determined whether the variable i is less than two times the value of a variable $T_s$, wherein $T_s$ represents the this size of the system table in segments. For example, in an embodiment comprising a system table having four segments of table data, it would be determined at decision block 509 whether the variable i is less than eight. If the variable i does meet the condition of decision block 509, process 500B progresses to block 511 where the variable i is incremented. The process further progresses to block 513 where the variable n is set to equal the current value of the variable i. The process 500B further proceeds to decision block 517, where, as discussed above, it is determined whether segment $Seg_n$ has been previously loaded to volatile memory. If, at decision block 509, it is determined that i is not less than two times the variable $T_s$, the process 500B terminates at block 518, and the system table is fully reconstructed.

Data storage systems in accordance with one or more embodiments disclosed herein may provide one or more of the following benefits. For example, one embodiment is a progressive flushing approach may keep each executed command at a small bounded execution time. Another embodiment includes a system table storage mechanism that is optimal for large sequential host writes. Another embodiment includes a storage mechanism that can support large system tables; while another embodiment is a method to load segmented data. Some of the embodiments avoid the complexity of logs. The large sequential use case may make this mechanism particularly useful. Furthermore one or more of the following goals may be achieved through implementation of a data storage system in accordance with one or more embodiments disclosed herein: Improved power-up time, by reconstructing in real-time as commands are accepted; necessary segments of system data can be loaded on demand; large system data can use this approach and still maintain a good command response time during reconstruction; large sequential host writes may be optimized, particularly when the table pages updated are also sequential; command response time may be uniform based on the progressive table flushes; and avoidance of large burst writes.

CONCLUSION

Data storage systems may include system tables having various sizes and/or characteristics. With respect to system tables of certain sizes, it may be desirable to periodically store table data and/or table change logs, in non-volatile memory in order to avoid unwanted data loss. However, storage of table data may make present various data storage and/or loading efficiency concerns. Furthermore, loading partial segments of system table data may be difficult in systems with inadequate, or complicated, data coherency characteristics.

As described herein, certain data storage systems may implement progressive copying, or "flushing," of system table data to non-volatile storage, wherein one or more additional table pages or segments are flushed to the non-volatile storage for every table update trigger. Such systems may benefit from improved data storage and/or loading efficiency.

OTHER VARIATIONS

As used in this application, "non-volatile memory" typically refers to solid-state memory such as, but not limited to, NAND flash. However, the systems and methods of this disclosure may also be useful in more conventional hard drives and hybrid hard drives including both solid-state and hard drive components. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

Those skilled in the art will appreciate that in some embodiments, other types of system table storage and/or reconstruction can be implemented. In addition, the actual steps taken in the processes shown in FIGS. 4, 5A, and 5B may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile storage system comprising:
a non-volatile memory configured to store data;
a volatile memory; and
a controller configured to progressively flush a system table stored in y table pages in the volatile memory to the non-volatile memory at least in part by:
  receiving a command from a host system that indicates that a first page of the system table is to be updated;
  updating content of the first page in response to receiving the command; and
  in response to receiving the command, flushing both the updated first page and a set of x additional pages of the system table to the non-volatile memory, wherein content of the set of additional pages is not updated in response to receiving the command;
wherein flushing the set of x additional pages guarantees that the system table can be reconstructed using a number z or fewer read operations, wherein $z=y \cdot ((x+1)/x)$.

2. In a data storage system, a method of progressively flushing system table information to non-volatile memory, the method comprising:
receiving a first command from a host system that indicates that a first page of a system table stored in y pages in a volatile memory of the data storage system is to be updated, wherein y is a number greater than one;
in response to receiving the first command:
  updating the first page in the volatile memory; and
  flushing both the updated first page and a first set of x additional pages of the system table to the non-volatile memory, wherein the content of the first set of additional pages is not updated in response to receiving the first command;
wherein flushing the first set of x additional pages guarantees that the system table can be reconstructed using a number z or fewer read operations, wherein $z=y \cdot ((x+1)/x)$;
wherein the method is performed under the control of a controller of the data storage system.

3. The method of claim 2, wherein x=1.
4. The method of claim 2, wherein x=2.
5. The method of claim 2, wherein x=3.
6. The method of claim 2, wherein x is greater than 3.

7. The method of claim 2, further comprising:
receiving a second command from the host system that indicates that a second page of the system table is to be updated;
in response to receiving the second command:
updating the second page in the volatile memory; and
flushing both the updated second page and a second set of x additional pages of the system table to the non-volatile memory, wherein the content of the second set of pages is not updated in response to receiving the second command;
wherein flushing the updated first page and the first set of additional pages is performed prior to receiving the second command, and wherein the first set of additional pages is different from the second set of additional pages.

8. The method of claim 2, wherein flushing the first set of additional pages is performed after flushing the updated first page, but prior to flushing any subsequently updated table pages to the non-volatile memory.

9. In a data storage system, a method of recovering a system table having y table pages, the method comprising:
reading a set of z table pages from a non-volatile memory to a volatile memory, wherein z is a number greater than y, but less than or equal to 2y, wherein the set of z table pages comprises at least one copy of each of the y table pages; and
locating within the set of z table pages a most up-to-date version of each of the y table pages of the system table;
copying the most up-to-date versions of each of the y table pages to a volatile memory, thereby generating an up-to-date version of the system table in the volatile memory;
wherein the set of z table pages comprises z table pages that were most recently flushed to the non-volatile memory;
wherein the method allows for recovering the system table using a limited number z or fewer read operations;
wherein z is less than or equal to $y*((x+1)1/x)$, wherein x is an integer value; and
wherein the method is performed under the control of a controller of the data storage system.

10. The method of claim 9, wherein locating the most up-to-date version of each page of the system table comprises:
reading each of the z table pages in order from a most-recently stored page to a least-recently stored page; and
for each of the z pages, determining whether a more up-to-date version of the page was previously read, wherein when it is determined that a more up-to-date version of the page was not previously read, the up-to-date version of the system table is updated to include the page.

11. The method of claim 9, wherein x=1.

12. The method of claim 9, wherein x=2.

13. The method of claim 9, wherein x=3.

14. The method of claim 9, wherein x is greater than 3.

15. The method of claim 9, wherein the set of z table pages are divided into segments and the reading and locating are performed in order according to individual segments.

16. The method of claim 15, wherein a segment containing an address in a host data access request is processed on demand to service the host data access request.

* * * * *